(12) United States Patent
Naruse et al.

(10) Patent No.: US 9,076,087 B2
(45) Date of Patent: Jul. 7, 2015

(54) ELECTRONIC APPARATUS HAVING DISPLAY FUNCTION AND TOUCH PANEL FUNCTION AND IMAGE FORMING APPARATUS HAVING DISPLAY FUNCTION AND TOUCH PANEL FUNCTION

(71) Applicant: KYOCERA Document Solutions Inc., Osaka (JP)

(72) Inventors: Kentaro Naruse, Osaka (JP); Rie Tezuka, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 14/339,138

(22) Filed: Jul. 23, 2014

(65) Prior Publication Data

US 2015/0036180 A1    Feb. 5, 2015

(30) Foreign Application Priority Data

Jul. 31, 2013  (JP) .................................. 2013-159045

(51) Int. Cl.
*G06F 3/12*   (2006.01)
*G06K 15/00*  (2006.01)
*G06F 3/045*  (2006.01)

(52) U.S. Cl.
CPC .............. *G06K 15/005* (2013.01); *G06F 3/045* (2013.01)

(58) Field of Classification Search
USPC .......... 345/650–666, 681, 902; 358/1.1–3.29, 358/1.11–1.18
See application file for complete search history.

(56) References Cited

U.S. PATENT DOCUMENTS

2008/0225017 A1*  9/2008  Kim et al. ...................... 345/175
2008/0230497 A1*  9/2008  Strickland et al. .............. 211/26

FOREIGN PATENT DOCUMENTS

JP          2012-118850         6/2012

* cited by examiner

*Primary Examiner* — Marcellus Augustin
(74) *Attorney, Agent, or Firm* — Knobbe, Martens, Olson & Bear LLP (57) ABSTRACT

An electronic apparatus includes a display unit that includes a display screen including a touch panel configured to display an image and to accept an input from an operator made by touching the touch panel, a touch position detection unit that detects a position touched by the operator on the display screen of the display unit, upon receipt of a detection signal outputted from the display unit according to detection by the touch panel, a calibration execution unit that executes calibration to correct a shift of the touch position detected by the touch position detection unit, and a human body sensor that outputs a detection signal upon detecting that the operator has come to a position spaced from the electronic apparatus by a predetermined distance. The calibration execution unit executes the calibration upon receipt of the detection signal from the human body sensor.

6 Claims, 5 Drawing Sheets

ELECTRONIC APPARATUS HAVING DISPLAY FUNCTION AND TOUCH PANEL FUNCTION AND IMAGE FORMING APPARATUS HAVING DISPLAY FUNCTION AND TOUCH PANEL FUNCTION

INCORPORATION BY REFERENCE

This application claims priority to Japanese Patent Application No. 2013-159045 filed on Jul. 31, 2013, the entire contents of which are incorporated by reference herein.

BACKGROUND

The present disclosure relates to an electronic apparatus and an image forming apparatus, and in particular to a calibration process for a touch panel provided in a display unit.

An image forming apparatus, an example of the electronic apparatus, normally includes a display unit having a touch panel function. The touch panel function is involved with the operation of most of the functions of the apparatus, and is hence very frequently used. The touch panels incorporated in the operation unit of the image forming apparatus can be broadly classified into a static capacitance type and a resistive film type, out of which the latter has the longer history of use, and has been employed in various kinds of apparatuses. The advantages of the resistive film touch panel are, for example, that the hardware is inexpensive, that the algorithm for realizing the functions of the touch panel is not complicated, and that the power consumption is low because it is not necessary to employ a high-performance IC or component for the input interface and the control circuit.

However, the touch panel, in particular the resistive film touch panel is intrinsically susceptible to electromagnetic interference (EMI) and humidity, and also the output value of the sensor fluctuates because of a change in temperature and degradation with time, since the resistive film touch panel is controlled by an analog method. In other words, the touch panel erroneous detects the position touched by an operator. Accordingly, calibration has to be performed under a non-input state, to prevent a reference position (datum point) under the non-input state from shifting.

In general, the calibration process for preventing the erroneous detection is designed to utilize a motion sensor so as to perform the calibration when an operator is not present in the vicinity of the apparatus and to suspend the calibration when the operator is close to the apparatus, to thereby prevent a failure of the calibration provoked by the operator by a touch of the touch panel during the calibration (known technique A).

SUMMARY

The disclosure proposes further improvement of the foregoing technique.

In an aspect, the disclosure provides an electronic apparatus including a display unit, a touch position detection unit, a calibration execution unit, and a human body sensor.

The display unit includes a display screen including a touch panel configured to display images and to accept an input from an operator made by touching the touch panel.

The touch position detection unit detects a position touched by the operator on the display screen of the display unit, upon receipt of a detection signal outputted from the display unit according to detection by the touch panel.

The calibration execution unit executes calibration to correct a shift of the touch position detected by the touch position detection unit.

The human body sensor outputs a detection signal upon detecting that the operator has come to a position spaced from the electronic apparatus by a predetermined distance.

The calibration execution unit executes the calibration upon receipt of the detection signal from the human body sensor.

In another aspect, the disclosure provides an image forming apparatus including the aforementioned electronic apparatus, and an image forming unit that forms an image on a recording medium.

DETAILED DESCRIPTION

Figure 1:
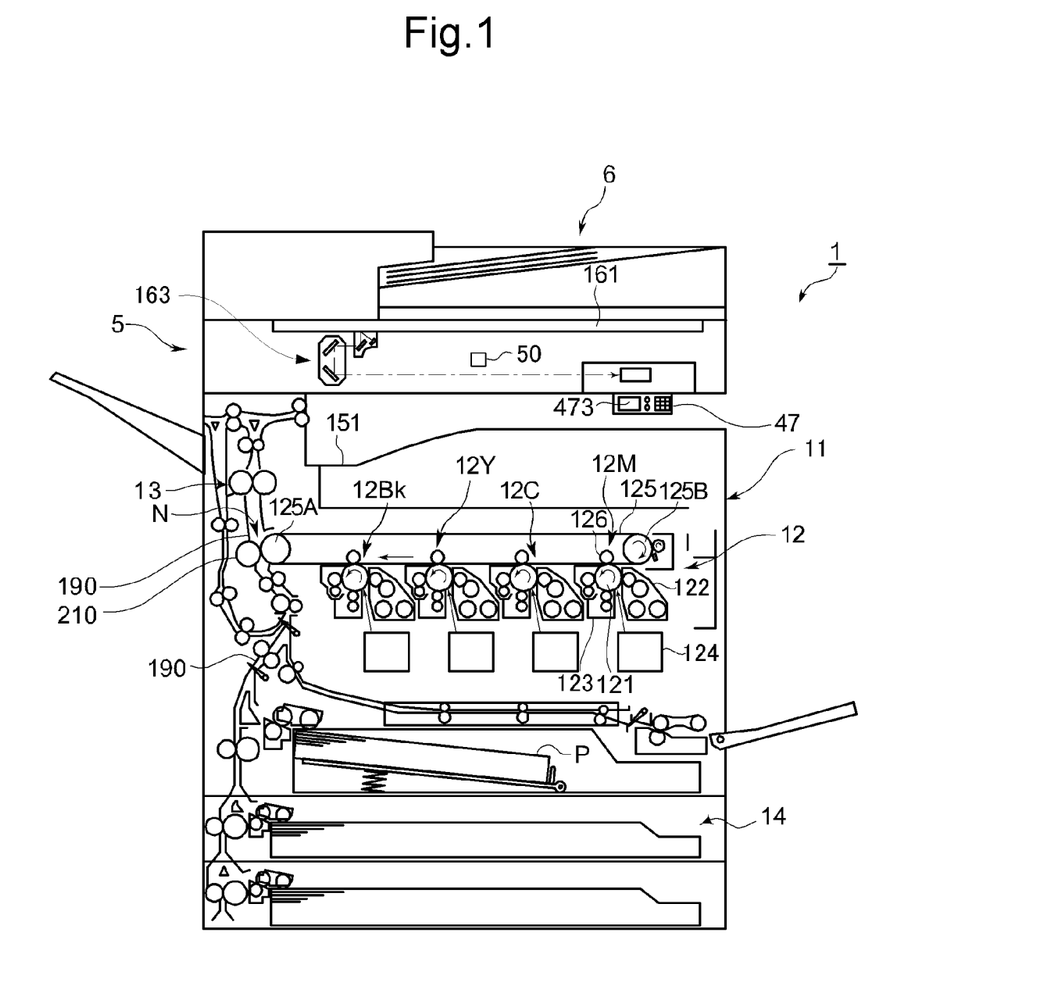
FIG. 1 is a front cross-sectional view showing a configuration of an image forming apparatus according to an embodiment of the disclosure.

Hereafter, an image forming apparatus according to an embodiment of the disclosure will be described with reference to the drawings. FIG. 1 is a front cross-sectional view showing a configuration of the image forming apparatus according to the embodiment of the disclosure.

The image forming apparatus 1 according to the embodiment of the disclosure is a multifunctional peripheral having a plurality of functions such as a copying function, a printing function, a scanning function, and a facsimile function. The image forming apparatus 1 includes a main body 11, in which an operation unit 47, an image forming unit 12, a fixing unit 13, a paper feed unit 14, a document feeding unit 6, and a document reading unit 5 are provided. The operation unit 47 includes a display unit 473 of a touch panel type that displays information such as an operation guidance for the operator, and also allows the operator to input an instruction and so forth by touching the touch panel.

When the image forming apparatus 1 performs the document reading operation, the document reading unit 5 optically reads the image on a source document fed by the document feeding unit 6 or placed on a platen glass 161, and generates image data. The image data generated by the document reading unit 5 is stored in a built-in HDD or a computer connected to a network.

When the image forming apparatus 1 performs the image forming operation, the image forming unit 12 forms a toner image based on the image data generated in the document reading operation or image data stored in the built-in HDD, on a recording sheet P exemplifying the recording medium in the disclosure delivered from the paper feed unit 14. The image forming subunits 12M, 12C, 12Y, and 12Bk of the image forming unit 12 each include a photoconductor drum 121, a charging unit 123, an exposure unit 124, a developing unit 122, and a primary transfer roller 126.

The respective developing unit 122 of each of the image forming subunits 12M, 12C, 12Y, and 12Bk includes therein a toner for developing a static latent image. The developing unit 122 supplies the toner to the surface of the photoconductor drum 121, which has undergone the charging by the charging unit 123 and the exposure by the exposure unit 124.

In the case of color printing, an image forming subunit 12M for magenta, an image forming subunit 12C for cyan, an image forming subunit 12Y for yellow, and an image forming subunit 12Bk for black in the image forming unit 12 each form the toner image on a photoconductor drum 121 based on the image data composed of the corresponding color component, through the charging, exposing, and developing processes, and a primary transfer roller 126 transfers the toner image onto an intermediate transfer belt 125 wound over a drive roller 125A and a slave roller 125B.

The intermediate transfer belt 125, the primary transfer roller 126, the drive roller 125A, and the slave roller 125B are implemented in an intermediate transfer unit.

The intermediate transfer belt 125 includes an image carrying surface formed on the outer circumferential surface, onto which the toner image is transferred, and is driven by the drive roller 125A, in contact with the circumferential surface of the photoconductor drum 121. The intermediate transfer belt 125 endlessly runs between the drive roller 125A and the slave roller 125B, in synchronization with the photoconductor drum 121.

The toner images of the respective colors are superposed at an adjusted timing when transferred onto the intermediate transfer belt 125, so as to form a colored toner image. A secondary transfer roller 210 transfers the colored toner image formed on the surface of the intermediate transfer belt 125 onto the paper sheet P transported along a transport route 190 from the paper feed unit 14, at a nip region N of a drive roller 125A engaged with the intermediate transfer belt 125. Then the fixing unit 13 fixes the toner image on the paper sheet P by thermal pressing. The paper sheet P having the colored image formed and fixed thereon is discharged to an output tray 151.

A human body sensor 50 for detecting the operator of the image forming apparatus 1 as the object is provided on the front face of the image forming apparatus 1 (in FIG. 1, center of the front face of the document reading unit 5). The human body sensor 50 includes a pyroelectric infrared sensor (not shown) and a control substrate (not shown) thereof. The pyroelectric infrared sensor includes a pyroelectric element with an electrode mounted on a substrate having a pyroelectric effect, and detects an object (human or stuff) present within a predetermined detection range, with the pyroelectric element. To be more detailed, the pyroelectric infrared sensor includes a pyroelectric element composed of a pyroelectric substrate formed of a ferroelectric material and electrodes opposed to the respective surfaces of the pyroelectric substrate. Infrared light generated from a motion of a human body is collected onto a photodetector of the pyroelectric element, and the pyroelectric infrared sensor converts a signal generated through polarization of the pyroelectric element according to the change in infrared light into a voltage signal, and decides that an object has been detected when the voltage signal that has undergone a predetermined process is decided to be a HIGH-level signal or a LOW-level signal through comparison with a threshold by a comparator, and outputs the HIGH-level or LOW-level signal.

Figure 2:
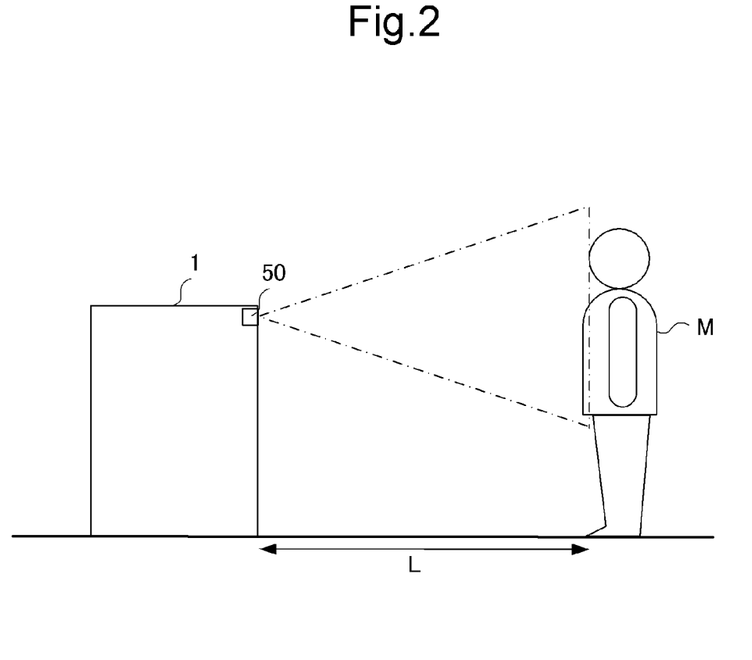
FIG. 2 is a schematic drawing showing a detection range of a human body sensor according to the embodiment of the disclosure.

FIG. 2 illustrates the detection range of the human body sensor 50. It is preferable that the human body sensor 50 has a viewing angle of 100 degrees or wider, so as to detect an operator M approaching the image forming apparatus 1 from the left or right, or from a front thereof. As shown in FIG. 2, the human body sensor 50 is configured to detect the operator at a predetermined distance L, for example 1 meter, from the image forming apparatus 1. In other words, the human body sensor 50 detects the operator M when he/she is within the predetermined distance L from the image forming apparatus 1, and outputs the detection signal.

Figure 3:
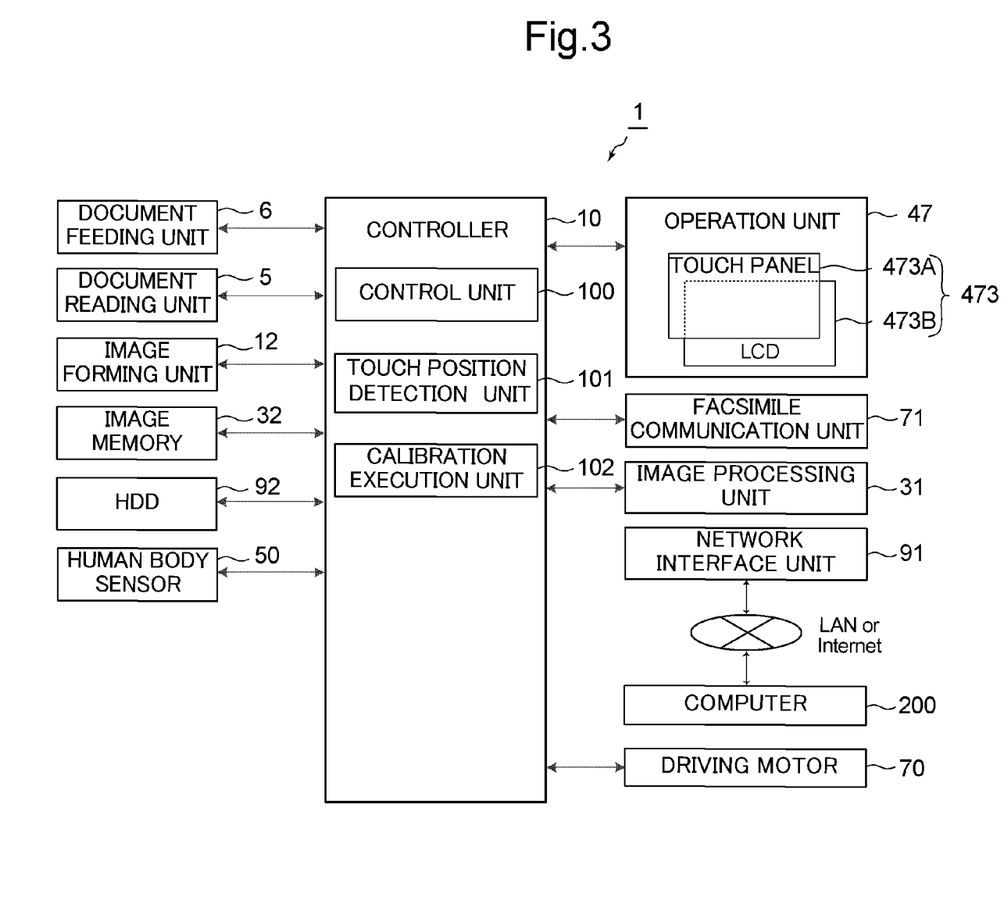
FIG. 3 is a functional block diagram showing essential internal constituents of the image forming apparatus according to the embodiment of the disclosure.

Hereunder, a configuration of the image forming apparatus 1 will be described. FIG. 3 is a functional block diagram showing essential internal constituents of the image forming apparatus 1.

The image forming apparatus 1 includes a controller 10. The controller 10 includes a central processing unit (CPU), a RAM, a ROM, and exclusive hardware circuits, and serves to manage the overall operation of the image forming apparatus 1.

The document reading unit 5 includes a reading mechanism 163 including a light emitter and a CCD sensor, to be controlled by the controller 10. The document reading unit 5 illuminates the source document with the light from the light emitter and detects the reflected light with the CCD sensor, to thereby read the image on the source document.

An image processing unit 31 processes the image data read by the document reading unit 5, as necessary. For example, the image processing unit 31 performs a predetermined image processing such as shading with respect to the image read by the document reading unit 5 so as to improve the quality of the image to be formed by the image forming unit 12.

An image memory 32 is a region for temporarily storing the image data of the source document acquired by the document reading unit 5, and data to be printed by the image forming unit 12.

The image forming unit 12 forms the image based on the image data acquired by the document reading unit 5, and print data received from a computer 200 connected to a network.

The operation unit 47 accepts instructions inputted by a user with respect to the operations and processes that the image forming apparatus 1 is capable of performing. The operation unit 47 includes a display unit 473. The display unit 473 includes a touch panel 473A formed of a resistive film, and a liquid crystal display (LCD) panel 473B. The touch panel 473A is superposed on the liquid crystal display panel 473B.

The touch panel 473A includes a transparent glass substrate (not shown) and a soft transparent film (not shown) superposed on each other. The glass substrate includes a conductive layer and is connected to a resistor, and spacers (not shown) are provided at regular intervals between the glass substrate and the transparent film. Although the glass substrate and the transparent film are insulated by the narrow gap corresponding to the spacer, when the transparent film is pressed above the transparent film is short-circuited with the glass substrate at the pressed point. The short circuit makes connection to different resistors depending on the pressed point on the glass substrate in an X-axis direction and a Y-axis direction. Therefore, the X-coordinate and the Y-coordinate of the pressed point, i.e., the touch position can be detected by applying a reference voltage to the glass substrate in both the X-axis direction and the Y-axis direction and measuring the divided voltage of the pressed point in the X-axis direction and the Y-axis direction. The touch panel 473A utilizes for example the divided voltage signal of the X-coordinate and the Y-coordinate of the pressed point as the detection signal, and outputs the detection signal to the controller 10 to be subsequently referred to.

Figure 4:
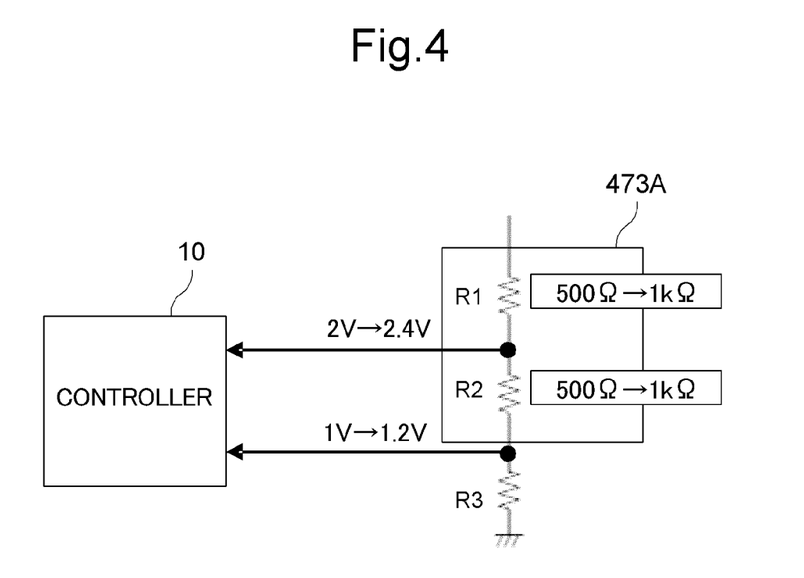
FIG. 4 is a schematic diagram showing resistors provided in a touch panel to generate divided voltages and a connection arrangement of the resistors, according to the embodiment of the disclosure.

In this embodiment, the touch panel 473A is set up as a multi-touch type. The touch panel 473A of the multi-touch type is capable of detecting each of a plurality of points that have been simultaneously pressed. In the multi-touch type touch panel 473A, the divided voltage is generated by, for example, the resistor provided in the touch panel and a resistor provided outside the touch panel. For example, at a given position on the glass substrate in the X-axis direction and the Y-axis direction, the divided voltage is generated by resistors R1, R2 in the touch panel and a resistor R3 outside of the touch panel as shown in FIG. 4, and such a divided voltage is outputted to the controller 10 as the detection signal.

In the multi-touch type touch panel 473A thus configured, the resistance of the resistors R1, R2 in the touch panel and the resistance of the resistor R3 outside of the touch panel may fluctuate differently when the ambient temperature or humidity changes, and therefore the divided voltage may be generated at a different value owing to the fluctuation of the resistance of the resistors in and outside of the touch panel.

When the ambient temperature or humidity changes, although the resistors R1, R2 in the touch panel can be assumed to change in the same way under the same environment (for example, from 500Ω to 1 KΩ), since the resistor R3 outside of the touch panel is under a different environment the resistance changes differently from the resistors R1, R2 in the touch panel. Accordingly, for example, the divided voltage at a contact S1 may increase to 2.4 V from 2 V, and the divided voltage at a contact S2 may increase to 1.2 V from 1 V. Here, the cited voltage values are mere examples for the sake of clarity of the description.

Therefore, the touch panel 473A includes at least two correction electrodes (not shown) each located at a predetermined position, for executing calibration as will be subsequently described. The correction electrodes are not short-circuited during normal operation, but are short-circuited when the calibration is performed. When the correction electrode is short-circuited, the glass substrate and the transparent film are short-circuited with each other at the position where the correction electrode is located. In other words, the pressing action of the transparent film is reproduced at the position where the correction electrode is located. Therefore, the calibration of outputting a standard divided voltage can be performed by detecting whether the standard divided voltage is outputted at the time of the short-circuit, and adjusting the reference voltage value in the case where the standard divided voltage is not outputted.

The display unit 473 displays an operation screen, a preview screen, a job status check screen, and so forth, when the image forming apparatus 1 is in a normal operation mode. When the image forming apparatus 1 is in a sleep mode, the display unit 473 is turned off.

A facsimile communication unit 71 includes, though not shown, an encoding/decoding unit, a modem, and a network control unit (NCU), to perform facsimile transmission through a public circuit.

A network interface unit 91 includes a communication module such as a LAN port, to transmit and receive data to and from the computer 200 in the local area, through the LAN connected to the network interface unit 91.

A hard disk drive (HDD) 92 is a large-capacity storage device for storing source image acquired by the document reading unit 5 and so on.

The human body sensor 50 outputs a detection signal upon detecting that the image forming apparatus 1 is approached by the operator.

A driving motor 70 is a drive source that provides a rotational driving force to transport roller pairs 19 of the image forming unit 12.

The controller 10 includes a control unit 100, a touch position detection unit 101, and a calibration execution unit 102.

The control unit 100 serves to control the overall operation of the image forming apparatus 1. The control unit 100 is connected to the document reading unit 5, the document feeding unit 6, the image processing unit 31, the image memory 32, the image forming unit 12, the operation unit 47, the facsimile communication unit 71, the network interface unit 91, the HDD 92, and the human body sensor 50, and serves to control the operation of the cited functional units.

The control unit 100 also turns on the display unit 473 upon receipt of the detection signal from the human body sensor 50 when the display unit 473 is off.

The touch position detection unit 101 receives the detection signal from the display unit 473 to thereby detect the touch position on the touch panel 473A. As described above, the divided voltage signals of the pressed point obtained upon applying the reference voltage to the glass substrate in the X-axis direction and in the Y-axis direction are sequentially outputted from the display unit 473, as the detection signal. Accordingly, the touch position detection unit 101 detects the X-axis coordinate and the Y-axis coordinate of the touch position, on the basis of the detection signal received.

The calibration execution unit 102 performs the calibration. The calibration is the process of correcting erroneous detection committed by the touch position detection unit 101, in other words correcting a positional shift of the detected touch position from the initial position. To be more detailed, the calibration execution unit 102 controls the touch panel 473A so as to sequentially short-circuit the correction electrodes. The calibration execution unit 102 then compares the value of the divided voltage signal outputted by the touch panel 473A when each of the correction electrodes is short-circuited with the standard value, and adjusts the reference voltage to be applied to the touch panel 473A according to the difference therebetween, so as to allow the standard divided voltage to be outputted.

The calibration execution unit 102 performs the calibration upon receipt of the detection signal from the human body sensor 50. Accordingly, the calibration is started immediately before the operator about to operate the touch panel 473A of the display unit 473 comes close to the main body 11 of the image forming apparatus 1, since the calibration execution unit 102 performs the calibration when the operator reaches the position spaced from the image forming apparatus 1 by the predetermined distance L. The predetermined distance L may be set to such a distance that makes a time necessary for the operator walking at a predetermined speed, such as a normal walking speed, to reach the image forming apparatus 1 (more precisely, the position that allows the operator to touch the touch panel 473A) from the position spaced from the image forming apparatus 1 by the distance L longer than the time necessary for performing the calibration.

Thus, the calibration can be performed during the time in which the operator reaches the position where the touch panel 473A of the display unit 473 can be operated from the position spaced by the predetermined distance L, so that the positional deviation of the pressed point on the touch panel 473A can be securely prevented by the time that the operator touches the touch panel 473A.

Further, employing a power-saving type human body sensor 50, switchable to a sleep mode originally installed in the image forming apparatus 1, allows the execution timing of the calibration of the touch panel 473A as above, with a simple control algorithm and without the need to incorporate an additional components.

The human body sensor 50 notifies the control unit 100 that the operator has come close to the image forming apparatus 1, as an interrupt process. Accordingly, the display unit 473 can be turned on and the calibration of the touch panel 473A can be immediately started, once the human body sensor 50 has detected the approaching of the operator.

Figure 5:
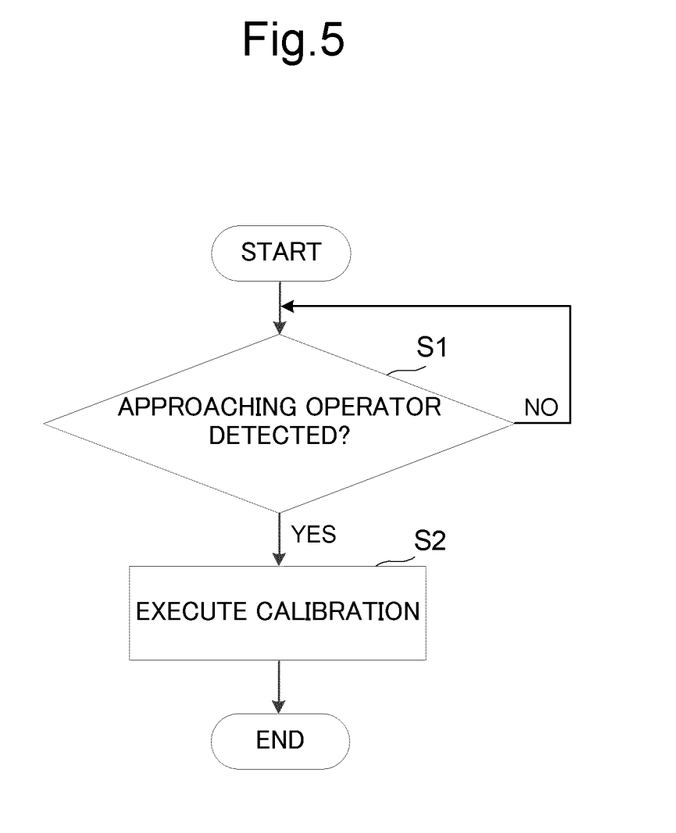
FIG. 5 is a flowchart showing a calibration process according to the embodiment of the disclosure.

The execution process of the calibration of the touch panel 473A will now be described hereunder. FIG. 5 is a flowchart showing the calibration execution process.

When the operator comes in front of the image forming apparatus 1, to the position spaced from the image forming apparatus 1 by the predetermined distance L, the human body sensor 50 detects the approaching operator (YES at S1).

When the calibration execution unit 102 receives the detection signal from the human body sensor 50 which has detected the operator, the calibration execution unit 102 performs the calibration (S2). After that, the processes from S1 to S2 are repeated.

The calibration execution unit 102 does not perform the calibration unless the human body sensor 50 detects the operator at the position corresponding to the predetermined distance L (NO at S1).

In a generally performed timing control of the calibration, for example, the calibration is performed at predetermined intervals in time. Under such a setting, in the case where the calibration is being performed when the operator wishes to operate the touch panel 473A of the display unit 473, the operator has to wait for the calibration to be over before the touch panel 473A becomes operable. With the arrangement according to this embodiment, in contrast, the situation cited above can be prevented, since the calibration execution unit 102 is kept from performing the calibration before the human body sensor 50 detects the operator at the position spaced from the image forming apparatus 1 by the predetermined distance L.

Further, with the calibration method according to the known technique A, in the case where a long period of time elapses after the calibration is completed in the absence of the operator before the next occasion that the operator operates the apparatus, erroneous detection (deviation of detected position) may again take place because of an impact of EMI or humidity imposed in the meantime, despite that the erroneous detection of the touch panel has once been corrected in the preceding session of the calibration. Thus, with the known technique A it is difficult to keep the touch panel free from the erroneous detection for an occasion that the operator wishes to operate the touch panel.

With the arrangement according to this embodiment, in contrast, the calibration is completed immediately before the operator reaches the position that allows the operator to operate the touch panel 473A, after the human body sensor 50 detects the operator at the position spaced from the image forming apparatus 1 by the predetermined distance. Therefore, the erroneous detection (deviation of detected position) of the touch panel 473A can be securely prevented, when the operator touches the touch panel 473A.

In addition, in this embodiment the calibration is performed after detection of the operator by the human body sensor 50 so as to prevent the deviation of detected position of the touch panel 473A, instead of repeating the calibration at regular intervals in time. Therefore, the image forming apparatus 1 according to this embodiment also contributes to reduction of power consumption.

The disclosure is in no way limited to the foregoing embodiment, but may be modified in various manners.

For example, the calibration execution unit 102 may be set to perform the calibration upon receipt of the detection signal from the human body sensor 50, and at a predetermined time after the preceding session of the calibration.

Before a certain amount of time elapses after the preceding session of the calibration, the output value of the human body sensor 50 can be assumed to be unchanged by changes in temperature and degradation with time, and hence the calibration is not mandatory. Setting thus the calibration execution unit 102 so as to perform the calibration at a predetermined time after the preceding session of the calibration, in addition to the time of receipt of the detection signal from the human body sensor 50 suppresses occurrence of a situation that the operator is unable to operate the touch panel during the calibration, and a situation that the calibration is repeated within a short period of time. Therefore, the image forming apparatus 1 is capable of preventing deviation of detected position while the operator is operating the touch panel 473A, and of reducing the power consumption.

Although the image forming apparatus according to the disclosure is exemplified by the multifunctional peripheral in the foregoing embodiment, the disclosure may be applied to different electronic apparatuses including image forming apparatuses such as a printer, a copier, and a facsimile machine. Further, the disclosure may be applied to other electronic apparatuses that employ a touch panel system such as a medical instrument, a personal computer, and an ATM of a bank, in addition to the image forming apparatus.

The specific configurations and processes described with reference to FIGS. 1 through 5 are merely exemplary embodiments of the disclosure, and the configurations and processes of the disclosure are in no way limited to those embodiments.

Various modifications and alterations of this disclosure will be apparent to those skilled in the art without departing from the scope and spirit of this disclosure, and it should be understood that this disclosure is not limited to the illustrative embodiments set forth herein.

What is claimed is;

1. An electronic apparatus comprising:
    a display unit that includes a display screen including a touch panel configured to display an image and to accept an input from an operator made by touching the touch panel;
    a touch position detection unit that detects a position touched by the operator on the display screen of the display unit, upon receipt of a detection signal outputted from the display unit according to detection by the touch panel;
    a calibration execution unit that executes calibration to correct a shift of the touch position detected by the touch position detection unit; and
    a human both sensor that outputs a detection signal upon detecting that the operator has come to a position spaced from the electronic apparatus by a predetermined distance,
    wherein the calibration execution unit executes the calibration upon receipt of the detection signal from the human body sensor, and
    wherein the predetermined distance is set to a distance that makes a time necessary for the operator walking at a predetermined walking speed corresponding to a normal walking speed to reach the electronic apparatus from a position spaced from the electronic apparatus by that distance longer than the time necessary for performing the calibration.

2. The electronic apparatus according to claim 1, wherein the touch panel is based on a resistive film technique.

3. The electronic apparatus according to claim 1, wherein the human body sensor includes a pyroelectric infrared sensor.

4. An electronic apparatus comprising:
a display unit that includes a display screen including, a touch panel configured to display an image and to accept an input from an operator made by touching the touch panel;
a touch position detection unit that detects a position touched by the operator on the display screen of the display unit, upon receipt of a detection signal outputted from the display unit according to detection by the touch panel;
a calibration execution unit that executes calibration to correct a shift of the touch position detected by the touch position detection unit; and
a human body sensor that outputs a detection signal upon detecting that the operator has come to a position spaced from the electronic apparatus by a predetermined distance,
wherein the calibration execution unit executes the calibration upon receipt of the detection signal from the human body sensor, and
wherein the calibration execution unit performs the calibration upon receipt of the detection signal from the human body sensor, and at a predetermined time after a preceding session of the calibration.

5. An image forming apparatus comprising:
an image forming unit that forms an image on a recording medium;
a display unit that includes a display screen including a touch panel configured to display an image and to accept an input from an operator made by touching the touch panel;
a touch position detection unit that detects a position touched by the operator on the display screen of the display unit, upon receipt of a detection signal outputted from the display unit according to detection by the touch panel;
a calibration execution unit that executes calibration to correct a shift of the touch position detected by the touch position detection unit; and
a human body sensor that outputs a detection signal upon detecting that the operator has come to a position spaced from the electronic apparatus by a predetermined distance,
wherein the calibration execution unit executes the calibration upon receipt of the detection signal from the human body sensor, and
wherein the predetermined distance is set to a distance that makes a time necessary for the operator walking at a predetermined walking speed corresponding to a normal walking speed to reach the electronic apparatus from a position spaced from the electronic apparatus by that distance longer than the time necessary for performing the calibration.

6. The image forming apparatus according to claim 5, wherein the calibration execution unit performs the calibration upon receipt of the detection signal from the human body sensor, and at a predetermined time after a preceding session of the calibration.

* * * * *